(12) United States Patent
Li

(10) Patent No.: US 8,789,154 B2
(45) Date of Patent: Jul. 22, 2014

(54) ANTI-SHOULDER SURFING AUTHENTICATION METHOD

(75) Inventor: Qing Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 13/174,558

(22) Filed: Jun. 30, 2011

(65) Prior Publication Data
US 2013/0007857 A1 Jan. 3, 2013

(51) Int. Cl.
G06F 15/16 (2006.01)
H04L 29/06 (2006.01)
H04L 9/32 (2006.01)

(52) U.S. Cl.
CPC ........... *H04L 63/083* (2013.01); *H04L 9/3226* (2013.01); *H04L 2463/081* (2013.01)
USPC .......................................................... 726/6

(58) Field of Classification Search
USPC ........................................................ 726/5–6
See application file for complete search history.

(56) References Cited

U.S. PATENT DOCUMENTS

| 5,661,807 | A  | * | 8/1997  | Guski et al.     | 713/159 |
|-----------|----|---|---------|------------------|---------|
| 6,826,686 | B1 | * | 11/2004 | Peyravian et al. | 713/168 |
| 6,834,112 | B1 | * | 12/2004 | Brickell         | 380/279 |
| 7,480,384 | B2 | * | 1/2009  | Peyravian et al. | 380/277 |
| 7,581,100 | B2 |   | 8/2009  | Mizrah           |         |
| 7,769,999 | B2 | * | 8/2010  | Cao et al.       | 713/155 |
| 7,797,532 | B2 | * | 9/2010  | Miura et al.     | 713/156 |
| 8,196,189 | B2 | * | 6/2012  | Roskind          | 726/5   |
| 2003/0131266 | A1 | * | 7/2003  | Best et al.      | 713/202 |
| 2003/0149882 | A1 | * | 8/2003  | Hamid            | 713/186 |
| 2004/0158708 | A1 | * | 8/2004  | Peyravian et al. | 713/156 |
| 2006/0085845 | A1 | * | 4/2006  | Davis et al.     | 726/6   |
| 2007/0294538 | A1 | * | 12/2007 | Lim et al.       | 713/183 |
| 2008/0016333 | A1 | * | 1/2008  | Cao et al.       | 713/155 |
| 2008/0178252 | A1 | * | 7/2008  | Michaud          | 726/1   |
| 2008/0181403 | A1 | * | 7/2008  | Sakamoto         | 380/258 |

(Continued)

FOREIGN PATENT DOCUMENTS

| CN | 101651546 A | 2/2010 |  |
| JP | 2003140765 A | * 5/2003 | G06F 1/00 |

OTHER PUBLICATIONS

Lei et al., "A Virtual Password Scheme to Protect Passwords", 2008, IEEE Communications Society, ICC 2008 proceedings, pp. 1536-1540.*

(Continued)

*Primary Examiner* — Eleni Shiferaw
*Assistant Examiner* — Nelson Giddins
(74) *Attorney, Agent, or Firm* — Won Tae Kim

(57) ABSTRACT

Disclosed is a client device that includes: a user interface to receive a username and a first password associated with a server site visited by a user; a random number generator to generate a random number; and a processor to generate a second password by implementing a function based upon the first password and the random number and to command storage of the random number, the username, and the associated server site. If the user attempts to log onto the server site by inputting their username and the second password, the processor extracts the random number associated with the username and the server site and implements the function based upon the second password and the random number to generate the first password which replaces the second password entered by the user and is submitted to the server site.

28 Claims, 5 Drawing Sheets

(56) References Cited

U.S. PATENT DOCUMENTS

| | | | |
|---|---|---|---|
| 2008/0189772 A1* | 8/2008 | Sims et al. | 726/5 |
| 2009/0220075 A1* | 9/2009 | Sidhu et al. | 380/45 |
| 2010/0037303 A1* | 2/2010 | Sharif et al. | 726/6 |
| 2010/0174900 A1* | 7/2010 | Lin | 713/155 |
| 2011/0055585 A1 | 3/2011 | Lee | |
| 2011/0107101 A1* | 5/2011 | Funk | 713/170 |
| 2011/0145579 A1* | 6/2011 | Shin et al. | 713/169 |
| 2011/0289599 A1* | 11/2011 | Evenden et al. | 726/29 |
| 2012/0084571 A1* | 4/2012 | Weis et al. | 713/184 |
| 2012/0294445 A1* | 11/2012 | Radutskiy et al. | 380/278 |
| 2013/0124292 A1* | 5/2013 | Juthani | 705/14.26 |

OTHER PUBLICATIONS

Joshi, Y.; Das, D.; Saha, S., "Mitigating man in the middle attack over secure sockets layer," Dec. 9-11, 2009, Internet Multimedia Services Architecture and Applications (IMSAA), 2009 IEEE International Conference, pp. 1-5.*

Shujun Li; Schmitz, R., "A novel anti-phishing framework based on honeypots," Sep. 20, 2009-Oct. 21, 2009, eCrime Researchers Summit, 2009. eCRIME '09., pp. 1-13.*

Mohammadi, S.; Hosseini, S. Z., "Virtual Password Using Runge-Kutta Method for Internet Banking," Fe. 26-28, 2010, Communication Software and Networks, 2010. ICCSN '10. Second International Conference, pp. 507-512.*

Rekha, N.R.; Rao, Y.V.S.; Sarma, K.V.S.S.R., "Enhanced Key Life in Online Authentication Systems Using Virtual Password," Apr. 11-13, 2011, Information Technology: New Generations (ITNG), 2011 Eighth International Conference, pp. 366-369.*

Lei, et al., A Virtual Password Scheme to Protect Passwords, IEEE International Conferences on Communications, May 19-23, 2008, pp. 1536-1540.

International Search Report and Written Opinion—PCT/US2012/045057—ISA/EPO—Oct. 18, 2012.

* cited by examiner

US 8,789,154 B2

ANTI-SHOULDER SURFING AUTHENTICATION METHOD

BACKGROUND

1. Field

The present invention relates to an anti-shoulder surfing authentication method.

2. Relevant Background

Today, the use of client devices (also known as access terminals, remote stations, computing devices, etc.) is widespread. Such client devices can be either fixed (e.g., desktop computer) or mobile. Such mobile devices can provide a user with wireless phone access, Internet access, access to computer systems (personal, corporate, government, etc.), allow the user to perform on-line transactions such as on-line shopping, on-line banking, as well as other applications such as finding maps to particular locations, etc. Thus, today's mobile devices allow for wireless communication as well as almost all of the communication and Internet features associated with non-mobile or fixed computer systems. Examples of such mobile devices include: laptop (also known as notebook) computers, smart phones, cellular phones, personal digital assistants (PDAs), digital cameras, tablet computers, etc.

Passwords are widely used to protect personal information and asset information when a user connects to a server site. Such a protection method allows a connection to a server site and access to personal information, using the password set by a user. Unfortunately, when a password is exposed, attackers may obtain the password and then potentially access a user's personal information and asset information. Examples of such server sites that use password protection include server sites related to banks, stores, work, school, data centers, etc.

In particular, because of the rise of mobile devices, oftentimes mobile devices access server sites that perform personal transactions, at crowded locations, where a shoulder surfing attack may occur. Shoulder surfing is a security attack where the attacker obtains sensitive information through the direct observation of the user information entered at the mobile device, for example, by looking directly over someone's shoulder (or by other means). Password based authentication is one of the most widely deployed authentication schemes. Shoulder surfing attacks pose a serious threat for password based authentication.

An example of this is when a user logs into their private account at a server site (e.g., bank, store, work, school, data center, etc.) at a public location (e.g., conference room, coffee shop, library, mall, etc.) with their mobile device. The mobile device's screen, keyboard or the user's hand movements may be completely exposed and viewed by an attacker. Based upon the attacker's direct observations, the attacker can later successfully log into the same account at the sever site with the observed username and password. Many online applications and services employ password based authentication in a client-server model. The user does not have any control over the implementation at the server end. Therefore, techniques are sought after to prevent shoulder surfing attacks based upon potential direct observations of the username, password, and server site visited by a user with their client device by an attacker.

SUMMARY

Aspects of the invention may relate an apparatus, system, and method for a client device to create a second password. The client device may include: a storage device; a user interface to receive a username and a first password associated with a server site visited by a user; a random number generator to generate a random number; and a processor to generate a second password by implementing a function based upon the first password and the random number and to command storage of the random number, the username, and the associated server site to the storage device. If the user attempts to log onto the server site by inputting their username and the second password, the processor extracts the random number associated with the username and the server site from the storage device and implements the function based upon the second password and the random number to generate the first password which replaces the second password entered by the user and is submitted to the server site.

DETAILED DESCRIPTION

The word "exemplary" is used herein to mean "serving as an example, instance, or illustration." Any embodiment described herein as "exemplary" or "example" is not necessarily to be construed as preferred or advantageous over other embodiments.

Figure 1:
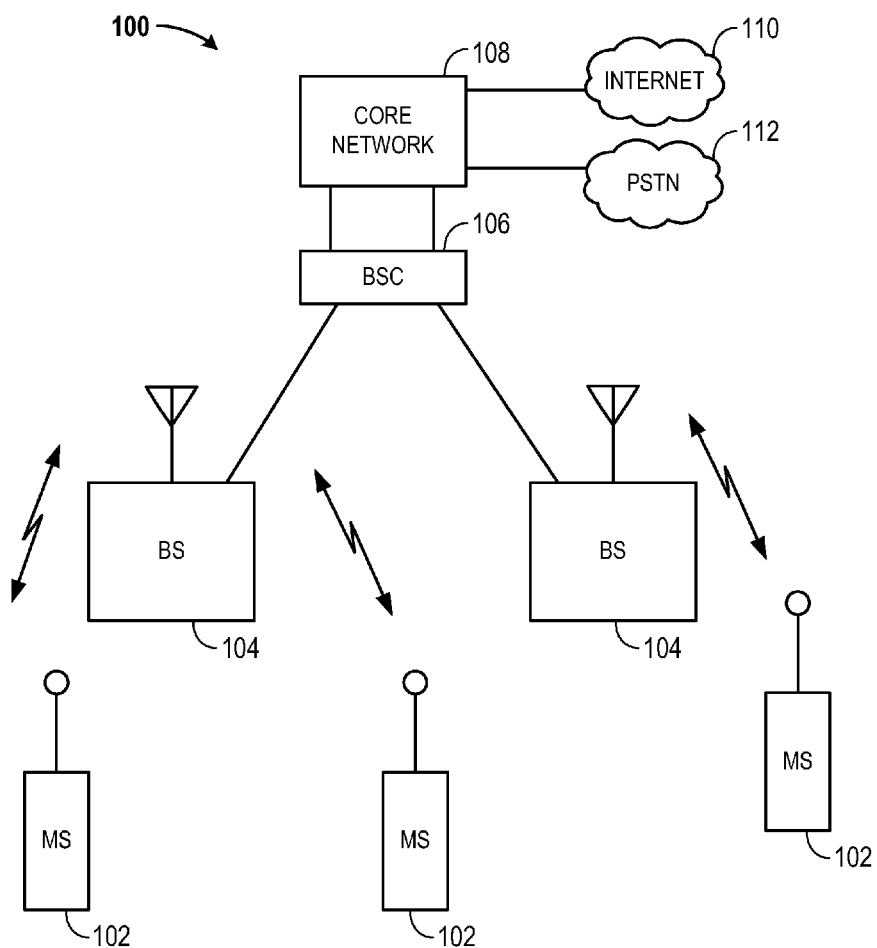
FIG. 1 is a block diagram of an example of a wireless communication system.

With reference to FIG. 1, a wireless mobile station (MS) 102 may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device 102 may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

Aspects of the invention relate to preventing shoulder surfing attacks, or other types of attacks, based on direct observations of the username, password, and server site visited by a user utilizing a mobile client device 102 to access a server site in a public area by an attacker. It should be noted that the modifications described hereinafter only relate to modifications at the mobile client device 102 and do not require modifications of the server site. Further, as examples, a mobile client device 102 may be: laptop computers, smart phones, cellular phones, personal digital assistants (PDAs), digital cameras, mobile computers, etc., and may be typically referred to as a wireless device. However, aspects of the invention also relate to wired devices. Hereinafter, the term client device 102 will be utilized which can be either a wireless or wired device, fixed or mobile.

In particular, aspects of the invention relate to an apparatus, method, and system that create a second password for a user. For example, client device 102 may comprise: a storage device; a user interface to receive a username and a first password associated with a particular server site visited by a user; a random number generator to generate a random number; and a processor. The processor may be used to: generate a second password by implementing a function based upon the first password and a random number; and command storage of the random number, the username and the associated server site to the storage device. After generating the second password, when the user attempts to log onto the particular server site by inputting their username and the second password, the processor may extract the random number associated with the username and the server site from the storage device. The processor may then implement the function based upon the second password and the random number to generate the first password which replaces the second password entered by the user and is submitted to the particular server site such that the user can access the server site. Thus, the client device 102 acts as an anti-shoulder surfing authentication mechanism.

Figure 2:
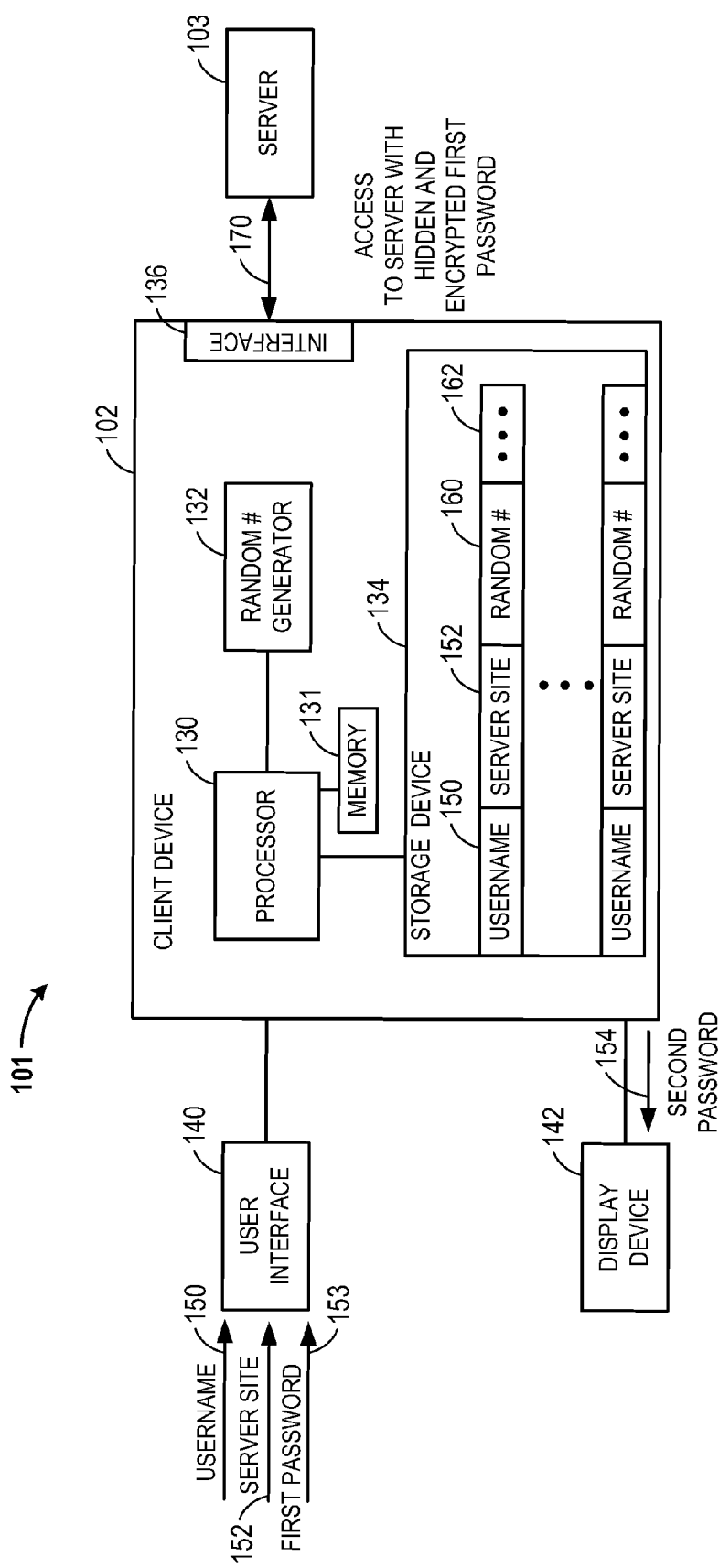
FIG. 2 is a block diagram of a system in which aspects of the invention may be practiced.

With reference to FIG. 2, FIG. 2 is a block diagram of a system 101 in which aspects of the invention may be practiced. In particular, system 101 includes a client device 102 that can create a second password for a user. Client device 102 may include a display device 142, a user interface 140, a random number generator 132, and a processor 130. Display device 142 may be a typical display device on a client device 102 such as a mobile device, cell phone, personal digital assistant, laptop computer, etc. User interface 140 may be a keypad, keyboard, or another type of user input device, typically used with a client device 102.

In one aspect, client device 102 may include a processor 130 and memory 131 configured to execute instructions for creating and utilizing a second password, as will be discussed hereinafter. Memory 131 may be coupled to processor 130 to store instructions for implementation by processor 130. Thus, client device 102 is configured to execute instructions to implement the creation of the second password and the utilization of the second password.

The user interface 140 may receive a username 150, a server site identifier 152, and a first password 153 associated with the particular server site 103 (e.g., a website) to be accessed by the user. Random number generator 132 may generate a random number 160 to be associated with the username 150 and the server site designator 152.

Processor 130 may generate a second password by implementing a function based upon the first password 153 and the random number 160. Processor 130 may command the storage of the username 150, the random number 160, and the associated designated server site 152 into the storage device 134 as part of a table 162. As shown in FIG. 2, table 162 may a plurality of usernames 150, server sites 152, and associated random numbers 160, along with other information.

The second password 154 that is generated may be displayed to the user on display device 142 such that the user then has the second password. The second password 154 can then be used when the user utilizes their client device 102 in an area where an attacker may try to observe the server site 103 visited and the password inputted by the user.

In one aspect, the first password 153 may be referred to as the user's normal password and the second password 154 may be referred to as the user's protected password. Also, the random number 160 may be a secure random number.

As will be described hereinafter, when the user attempts to logon to the particular server site 103 by inputting their username 150 and second password 154, processor 130 extracts the random number 160 associated with the username 150 and the server site 152 from the storage device. The processor implements the function based upon the second password 154 and the random number 160 to generate the first password 153 which replaces the second password entered by the user and is submitted to a particular server site 103 for access.

It should be noted that neither the first password 153 nor the second password 154 are stored at the mobile client device 102. Additionally, it should be noted that a user may have the client device 102 in a private environment for secrecy to create the second password 154 for their use. In this way, only the user knows the first password 153 and the second password 154, neither of which is stored by the client device 102, and therefore is not accessible by an attacker.

In one aspect, when the user is creating their second password 154 the user does not have to actually logon to the server site 103. In this implementation, the user locally enters their username 150, server site designator 152, and first password 153 and the processor implementing the program (e.g., software, firmware, or middleware) generates the second password 154 for display to the user on the display device 142, as previously described. In this process, the random number 160, server site 152 and username 150 are stored on the storage device 134. Thus, this process can be accomplished off-line. However, it may also be implemented on-line through interface 136, wired or wirelessly, via link 170, such that the client device 102 is in communication with the server site 103. Interface 136 may be a wireless interface including a transmitter and receiver that may communicate with server 103 via a wireless link (e.g., FIG. 1) and/or a wired interface to communicate through a wired link (e.g., a cable system, PSTN, other links, and combinations thereof) to communicate with server 103.

Figure 3:
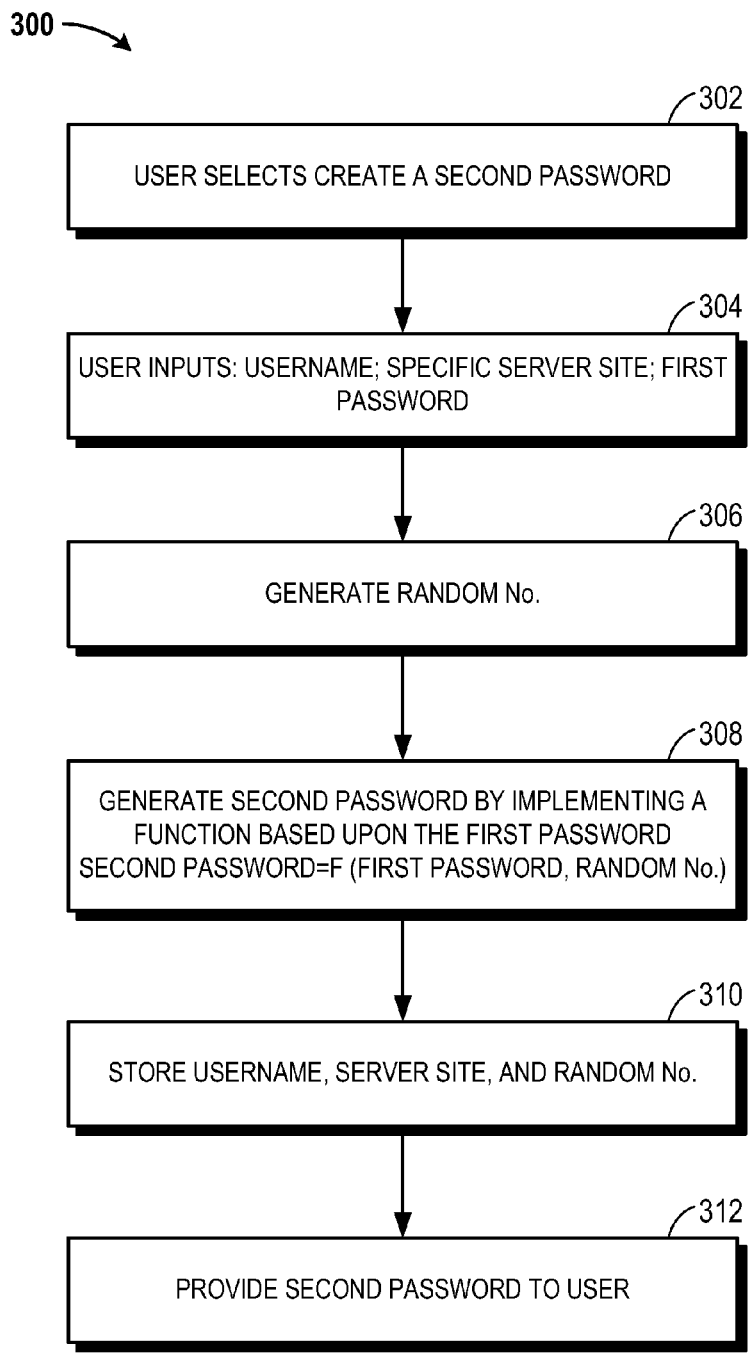
FIG. 3 is a flow diagram to illustrate a process to provide a second password to a user.

With brief reference to FIG. 3, a flow diagram is shown to illustrate a process 300 to provide a second password to a user. At Block 302, a user selects the create a second password function. The user then inputs their username 150, a specific server site 152, and their first password 153 through the user interface 140 (Block 304). A random number 160 is then generated (e.g., a secure random number) (Block 306). Processor 130 generates a second password 154 by implementing a function based upon the first password 153 and the random number (Block 308).

For example, the second password 154 may be a function of the first password 153 and the random number 160. The second password may be determined by the equation: Second Password=f(first password, random no.). Next, process 300 stores the username 150, server site 152, and random number 160 in the storage device 134 (Block 310). The second password 154 is then displayed to the user on the display device 142 (Block 312).

In one aspect, the function (f) may be a one to one mapping function, such as, a block cipher algorithm. In one particular aspect, the block cipher algorithm may be an advance encryption standard (AES) symmetric-key encryption operation, in which the second password 154 is outputted from the symmetric-key encryption operation using the random number 160 as a key and the first password 153 as plain text. Further, as will be described in more detail later, to determine the first password 153, a symmetric-key decryption operation ($f^{-1}$) using the random number 160 as the key and the second password 154 results in the first password as the output.

Figure 4:
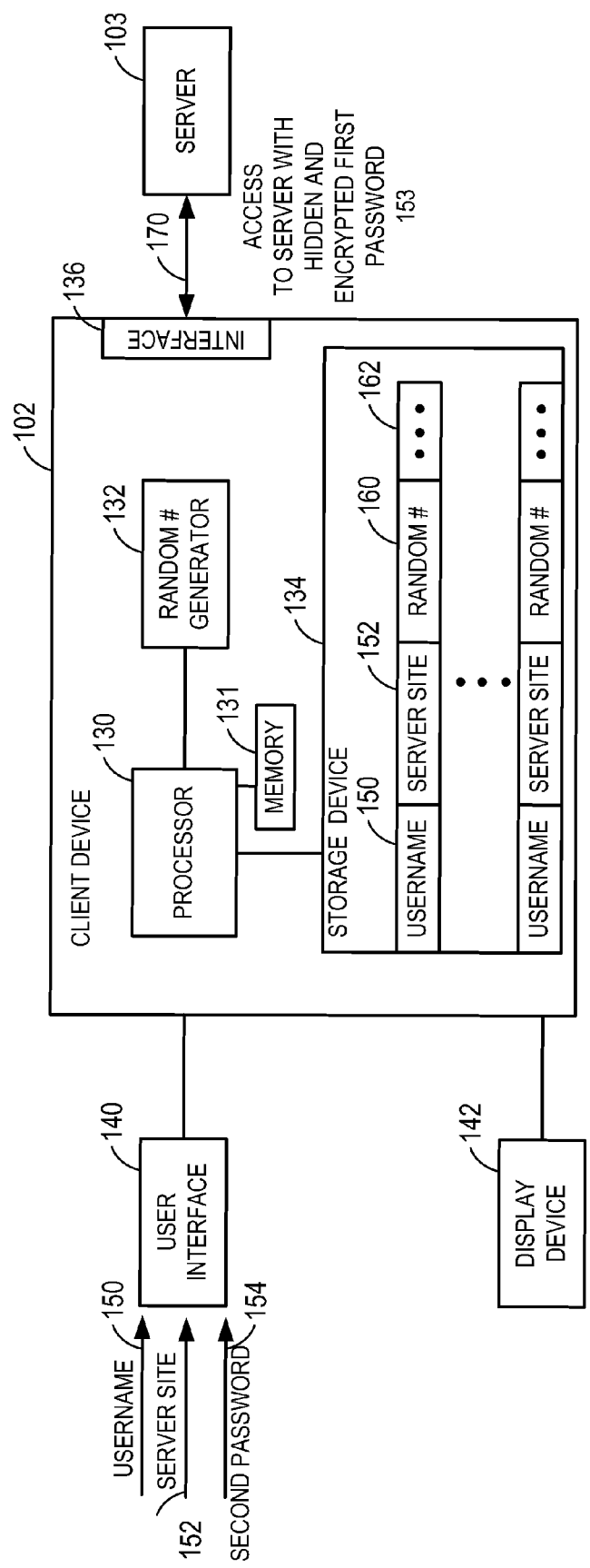
FIG. 4 is a block diagram of an example of utilizing the second password with the client device.

Referring also to FIG. 4, an example of utilizing the second password 154 with the client device 102 is illustrated. As shown in FIG. 4, a user may attempt to logon to a particular server site 103 by inputting their username 150, the server site designator 152, and the second password 154 through the user interface 140 of the client device 102. Processor 130 extracts the random number 160 associated with the username 150 and the server site 152 from the storage device 134 and implements the function based upon the second password 154 and the random number 160 to generate the first password 153 which replaces the second password entered by the user and is submitted to the particular server site 103. In particular, access to the server site 103 occurs through interface 136 and link 170 with the username 150 and the first password 153. The username 150 and the first password 153 may be in a hidden and encrypted format. Also, as previously described, link 170 may be a wireless link or wired link, or combinations thereof.

In operation, the user may select one of a normal mode or a protected mode. In the normal mode, a first password 153 and a server site designator 152 for a particular server site 103 to be visited by the user is inputted by the user via the user interface 140 and normal operation occurs. On the other hand, in the protected mode, the server site designator 152 and the second password 154 associated with the particular server site 103 to be visited by the user is inputted by the user through the user interface 140 to the client device 102. In various aspects, the processor 130 may operate in conjunction with middleware, software, firmware, or combinations thereof. Also, as examples, the server sites 103 visited by the user may be server sites or websites over the Internet such as, banks, stores, corporate, school, data centers, etc., or through any type of network (e.g., though public, private, corporate, government networks, etc.) in which a password for authentication is needed. Further, access to these server sites may occur through wireless and/or wired links and combinations thereof.

Figure 5:
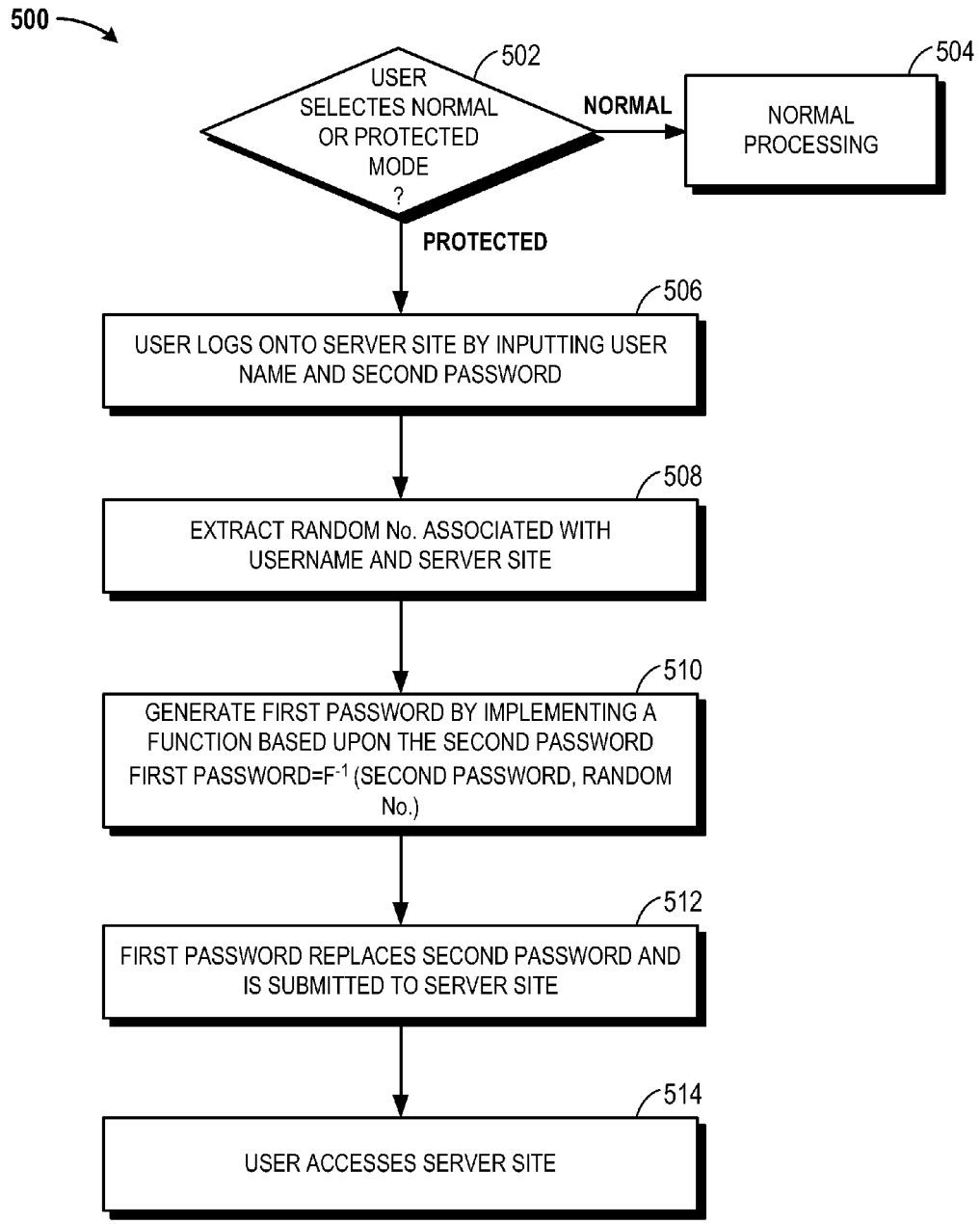
FIG. 5 is a flow diagram to illustrate a process to access a server site utilizing a second password.

With brief reference to FIG. 5, a flow diagram is shown to illustrate a process 500 to access a server site 103 utilizing a second password 154. At decision Block 502, a user selects a normal or a protected mode. If the normal mode is selected, then the client device 102 proceeds with normal processing (Block 504). However, if the protected mode is selected by a user, the user logs onto the server site 103 by inputting their username 150, the server site designator 152, and the second password 154 (Block 506). The random number 160 (e.g., a secure random number) associated with the username 150 and the server site designator 152 is extracted (Block 508).

Next, the first password 153 is generated by implementing a function based upon the second password (Block 510). For example, the first password may be achieved by an equation: First Password=$f^{-1}$(second password, random no.). The first password 153 replaces the second password 154 and is submitted via the interface 136 through link 170 to the server site 103 (Block 512). For example, access to the server site 103 may occur with the first password in encrypted and hidden form. The user may then access the server site 103 (block 514).

The function: (f)—may be a one to one mapping function. In one aspect, the function may be a block cipher algorithm. In one particular aspect, the block cipher algorithm is an advanced encryption standard (AES) symmetric-key encryption operation. As previously described, the second password is outputted from the symmetric-key encryption operation using the random number as a key and the first password as plain text. As to the first password, using the symmetric-key decryption operation ($f^{-1}$) with the random number as the key and the second password results in the first password as the output. It should be appreciated that a wide variety of different types of algorithms may be utilized.

In one particular aspect, a middleware module may be used by the client device 102, in which, the function of the middleware module is to examine and process sever/web forms containing username and password fields. The middleware may be configured to support protected access to particular sever sites. The middleware may operate in two modes: normal mode and protected mode. The middleware may provide a user screen to set the first password 153 inputted by a user for a specific server site 103 designated by the server site designator 152 for use by the protected mode to generate the second password 154. The middle layer may first generate a random number 160 and may then request the first password 153 be inputted by the user. Alternatively, the client device 102 may include other types of hardware, firmware, or software to implement a random number generator 132. The middleware may calculate the second password 154 as a function of the first password 153 and the random number 160. The middleware may then command the storage of the random number 160, username 150, and server site designator 152 to storage device 134.

As a further example, in operation, in the protected mode, the user inputs the second password 154 in a web form and the middleware extracts the second password from the web form, retrieves the stored random number 160 and calculates the first password 153. The middleware replaces the second password 154 with the first password 153 and submits the request to the server site 103. While in normal mode, the web form is transmitted to server without any modification. It should be appreciated that any combination of middleware, firmware, software, or hardware, may be utilized to implement aspects of the invention.

Aspects of the invention do not require any modification at the server site 103. Further, neither the first password 153 nor the second password 154 is stored at the client device 102. Accordingly, even if an attacker observes the second password 154 and the username 150 inputted by the user, the attacker is still not able to logon to the server site 103 without the same random number 160. Therefore, the risk of the attacker bypassing the authentication process by compromising the client device 102 to obtain the same random number, obtaining the second password, and installing the same program, all at the same time, is relatively low. Further, the user can regenerate a new second password 154 with a new random number 160 at any time if the user believes a compromise may have occurred. Therefore, aspects of the invention provide two factor authentication based upon: 1) the second (e.g., protected) password; and 2) the device with the random number. As is known to those of skill in the art, two-factor authentication requires two levels or two instances of authentication as opposed to one and thus two-factor authentication adds a second layer of security.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, middleware, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A client device comprising:
   a storage device;

a user interface to receive a username and a first password associated with a server site visited by a user;

a random number generator to generate a random number; and a processor to:

generate a second password by implementing a function based upon the first password and the random number; and command storage of the random number, the username, and the associated server site to the storage device, wherein the first password and the second password are not stored at the client device;

wherein, when the user attempts to log onto the server site by inputting their username and the second password, the processor is further configured to extract the random number associated with the username and the server site from the storage device, and implement an inverse of the function based upon the second password and the random number to generate the first password which replaces the second password entered by the user and is submitted to the server site.

2. The client device of claim 1, wherein the function is a one to one mapping function.

3. The client device of claim 1, wherein the function is a block cipher algorithm.

4. The client device of claim 3, wherein the block cipher algorithm is an advanced encryption standard (AES) symmetric-key encryption operation, wherein the second password is outputted from the symmetric-key encryption operation using the random number as a key and the first password.

5. The client device of claim 4, wherein, using a symmetric-key decryption operation with the random number as the key and the second password results in the first password as the output.

6. The client device of claim 1, wherein the user selects one of a normal mode or a protected mode, wherein, in the normal mode, the first password associated with the server site visited by the user is inputted by the user, whereas, in the protected mode, the second password associated with the server site visited by the user is inputted by the user.

7. The client device of claim 1, wherein the server site visited by the user is a web site over the Internet.

8. A method to create a second password for a client device comprising:

receiving a username and a first password associated with a server site visited by a user;

generating a random number utilizing a random number generator of the client device;

generating a second password by implementing a function based upon the first password and the random number utilizing a processor of the client device; and commanding storage of the random number, the username, and the associated server site, wherein the first password and the second password are not stored at the client device;

wherein, when the user attempts to log onto the server site by inputting their username and the second password, the random number associated with the username and the server site is extracted from storage and an inverse of the function is implemented based upon the second password and the random number to generate the first password which replaces the second password entered by the user and is submitted to the server site.

9. The method of claim 8, wherein the function is a one to one mapping function.

10. The method of claim 8, wherein the function is a block cipher algorithm.

11. The method of claim 10, wherein the block cipher algorithm is an advanced encryption standard (AES) symmetric-key encryption operation, wherein the second password is outputted from the symmetric-key encryption operation using the random number as a key and the first password.

12. The method of claim 11, wherein, using a symmetric-key decryption operation with the random number as the key and the second password results in the first password as the output.

13. The method of claim 8, wherein the user selects one of a normal mode or a protected mode, wherein, in the normal mode, the first password associated with the server site visited by the user is inputted by the user, whereas, in the protected mode, the second password associated with the server site visited by the user is inputted by the user.

14. The method of claim 8, wherein the server site visited by the user is a web site over the Internet.

15. A client device comprising:

means for receiving a username and a first password associated with a server site visited by a user;

means for generating a random number;

means for generating a second password by implementing a function based upon the first password and the random number; and means for commanding storage of the random number, the username, and the associated server site, wherein the first password and the second password are not stored at the client device;

wherein, when the user attempts to log onto the server site by inputting their username and the second password, the random number associated with the username and the server site is extracted from storage and an inverse of the function is implemented based upon the second password and the random number to generate the first password which replaces the second password entered by the user and is submitted to the server site.

16. The client device of claim 15, wherein the function is a one to one mapping function.

17. The client device of claim 15, wherein the function is a block cipher algorithm.

18. The client device of claim 17, wherein the block cipher algorithm is an advanced encryption standard (AES) symmetric-key encryption operation, wherein the second password is outputted from the symmetric-key encryption operation using the random number as a key and the first password.

19. The client device of claim 18, wherein, using a symmetric-key decryption operation with the random number as the key and the second password results in the first password as the output.

20. The client device of claim 15, wherein the user selects one of a normal mode or a protected mode, wherein, in the normal mode, the first password associated with the server site visited by the user is inputted by the user, whereas, in the protected mode, the second password associated with the server site visited by the user is inputted by the user.

21. The client device of claim 15, wherein the server site visited by the user is a web site over the Internet.

22. A computer program product to create a second password for a client device comprising:

a non-transitory computer-readable medium comprising code for:

receiving a username and a first password associated with a server site visited by a user;

generating a random number;

generating a second password by implementing a function based upon the first password and the random number; and commanding storage of the random number, the username, and the associated server site, wherein the first password and the second password are not stored at the client device;

wherein, when the user attempts to log onto the server site by inputting their username and the second password, the random number associated with the username and the server site is extracted from storage and an inverse of the function is implemented based upon the second password and the random number to generate the first password which replaces the second password entered by the user and is submitted to the server site.

23. The computer program product of claim 22, wherein the function is a one to one mapping function.

24. The computer program product of claim 22, wherein the function is a block cipher algorithm.

25. The computer program product of claim 24, wherein the block cipher algorithm is an advanced encryption standard (AES) symmetric-key encryption operation, wherein the second password is outputted from the symmetric-key encryption operation using the random number as a key and the first password.

26. The computer program product of claim 25, wherein, using a symmetric-key decryption operation with the random number as the key and the second password results in the first password as the output.

27. The computer program product of claim 22, wherein the user selects one of a normal mode or a protected mode, wherein, in the normal mode, the first password associated with the server site visited by the user is inputted by the user, whereas, in the protected mode, the second password associated with the server site visited by the user is inputted by the user.

28. The computer program product of claim 22, wherein the server site visited by the user is a web site over the Internet.

\* \* \* \* \*